US012750924B2

(12) United States Patent
Mandl et al.

(10) Patent No.: US 12,750,924 B2
(45) Date of Patent: Sep. 29, 2026

(54) HEATING DEVICE AND METHOD OF MANUFACTURING A HEATING DEVICE

(71) Applicant: E.G.O. Elektro-Geraetebau GmbH, Oberderdingen (DE)

(72) Inventors: Matthias Mandl, Bretten (DE); Michael Tafferner, Malsch (DE); Volker Block, Bretten (DE); Manuel Schmieder, Oberderdingen (DE); Holger Koebrich, Kraichtal-Gochsheim (DE); Roland Muehlnikel, Bretten (DE); Alfred Suss, Bretten (DE); Sebastian Eigl, Bretten (DE)

(73) Assignee: E.G.O. Elektro-Gerätebau GmbH, Oberderdingen (DE)

( * ) Notice: Subject to any disclaimer, the term of this patent is extended or adjusted under 35 U.S.C. 154(b) by 1043 days.

(21) Appl. No.: 17/934,274

(22) Filed: Sep. 22, 2022

(65) Prior Publication Data

US 2023/0107249 A1 Apr. 6, 2023

(30) Foreign Application Priority Data

Oct. 1, 2021 (DE) ..................... 10 2021 211 121.1

(51) Int. Cl.
*H05B 3/48* (2006.01)

(52) U.S. Cl.
CPC ......... *H05B 3/48* (2013.01); *H05B 2203/033* (2013.01)

(58) Field of Classification Search
None
See application file for complete search history.

(56) References Cited

U.S. PATENT DOCUMENTS 5,408,070 A * 4/1995 Hyllberg ............ G03G 15/0233 219/548
5,973,296 A * 10/1999 Juliano ............... B29C 45/2737 219/424
(Continued)

FOREIGN PATENT DOCUMENTS

DE 69901406 T2 10/2002
DE 10304906 A1 9/2004
(Continued)

OTHER PUBLICATIONS

European Patent Office, Extended European Search Report received for Application No. 22196071.9, Mar. 2, 2023, 10 pages, Germany.
(Continued)

*Primary Examiner* — Thor S Campbell
(74) *Attorney, Agent, or Firm* — ALSTON & BIRD LLP

(57) ABSTRACT

A heating device comprises a tubular carrier with an outside and an inside, an insulating layer on the outside of the carrier, heating conductors, conductor tracks, and contact fields on the insulating layer, and a connection device for an electrical connection of the heating device, wherein the connection device has a plurality of metallic contact feet. The connection device is attached at the contact fields with the contact feet and is electrically connected thereto. Additional electrical insulation is arranged between the connection device and the outside of the carrier. This can be, for example, one of several individual insulating layers that together form the entire insulating layer.

24 Claims, 4 Drawing Sheets

(56) References Cited

U.S. PATENT DOCUMENTS

| | | | | | |
|---|---|---|---|---|---|
| 6,043,466 | A * | 3/2000 | Jenko | B29C 45/1782 219/535 |
| 6,410,894 | B1 * | 6/2002 | Hoffmann | H05B 3/42 425/549 |
| 7,034,258 | B2 * | 4/2006 | Sutorius | B29C 45/2737 219/535 |
| 7,241,131 | B1 | 7/2007 | Booth et al. | |
| 9,196,990 | B2 | 11/2015 | Koebrich et al. | |
| 9,987,782 | B2 * | 6/2018 | Spuller | H05B 3/48 |
| 12,426,628 | B2 * | 9/2025 | Fraser | A24F 40/57 |
| 2001/0003336 | A1 * | 6/2001 | Abbott | F27D 11/02 118/724 |
| 2007/0254502 | A1 * | 11/2007 | Horikiri | H05K 1/147 439/79 |
| 2013/0022455 | A1 | 1/2013 | Weber et al. | |
| 2014/0154930 | A1 | 6/2014 | Koebrich et al. | |
| 2016/0341419 | A1 | 11/2016 | Fluhrer | |
| 2017/0036383 | A1 | 2/2017 | Gnther et al. | |
| 2019/0364619 | A1 * | 11/2019 | Schoenemann | H05B 3/46 |
| 2020/0046028 | A1 * | 2/2020 | Oh | H05B 3/46 |
| 2021/0396599 | A1 * | 12/2021 | Kuemmerle | H05B 1/02 |
| 2022/0386420 | A1 * | 12/2022 | Mandl | H05B 3/34 |
| 2023/0107249 | A1 * | 4/2023 | Mandl | H05K 1/189 219/534 |

FOREIGN PATENT DOCUMENTS

| | | | |
|---|---|---|---|
| DE | 60127679 | T2 | 12/2007 |
| DE | 102008010343 | A1 | 1/2009 |
| DE | 102012222363 | A1 | 6/2014 |
| DE | 102012222364 | A1 | 6/2014 |
| DE | 102015112748 | A1 | 2/2017 |
| EP | 2176869 | A2 | 4/2010 |
| EP | 3096585 | A1 | 11/2016 |
| JP | 2010-533980 | A | 10/2020 |
| KR | 101562238 | B1 | 10/2015 |

OTHER PUBLICATIONS

DE Office Action Mailed on Dec. 16, 2024 for DE Application No. 102021211121, 6 page(s).

English Translation of DE Office Action dated Dec. 16, 2024 for DE Application No. 102021211121, 6 page(s).

English translation of KR Office Action Mailed on Jan. 20, 2026 for KR Application No. 20220121398, 7 page(s).

KR Office Action Mailed on Jan. 20, 2026 for KR Application No. 20220121398, 6 page(s).

* cited by examiner

HEATING DEVICE AND METHOD OF MANUFACTURING A HEATING DEVICE

CROSS-REFERENCE TO RELATED APPLICATIONS

This application claims priority to German Application No. 10 2021 211 121.1, filed Oct. 1, 2021, the contents of which are hereby incorporated herein in its entirety by reference.

AREA OF APPLICATION AND PRIOR ART

The invention relates to a heating device having a tubular carrier and a method for manufacturing such a heating device.

US 2016/0341419 A1 discloses a heating device having a tubular carrier on which are arranged several heating conductors. Since the tubular carrier can be made of metal, it must have an insulating layer on the outside thereof, for example a glass-like insulating layer. It has been found that when applying the insulating layer by means of a conventional screen-printing process, it is difficult to carry out an overlapping of the print in such a way that a layer produced in one operation overlaps itself and is therefore full-surface. Furthermore, a connection device is required for an electrical connection to the heating conductors, which usually has metallic contact feet that are soldered onto contact fields.

DE 102012222363 A1 discloses a connection device to such a heating device having a tubular carrier. From this it can be seen how contact feet are arranged on the connection device. U.S. Pat. No. 9,196,990 B2 discloses such a connection device having contact feet with even more details.

OBJECT AND SOLUTION

The invention is based on the object of creating a heating device as mentioned at the outset and a method for the manufacture thereof with which problems of the prior art can be solved, and it is in particular possible to make the construction and operation of the heating device safe and at the same time the method of manufacturing thereof practicable.

This object is achieved through a heating device having the features of claim 1 and through a method for the manufacturing thereof having the features of claim 23. Advantageous and preferred configurations of the invention are the subject of the additional claims and are explained in more detail below. Some of the features are described only for the heating device or only for the method for the manufacturing thereof. They are however applicable by themselves and independently of one another both for such a heating device and for such a method. The wording of the claims forms part of the content of the description by explicit reference.

The heating device has a tubular carrier with an outside and with an inside. The carrier is advantageously a circular tube. A diameter can be greater than its length, but not necessarily so. An insulating layer is applied to the outside of the carrier, advantageously covering it substantially or for the most part, particularly advantageously between 50% and 100%. Heating conductors, contact fields and conductor tracks are provided or permanently applied to the insulating layer. The heating conductors consist of a conventional heating conductor material, and they are advantageously applied using a thick-film process such as screen-printing. The electrical connection thereof can be provided by means of conductor tracks that end in the contact fields. Furthermore provided for an electrical connection of the heating device is a connection device which has a plurality of metallic contact feet. These contact feet are then arranged on the contact fields, attached, in particular soldered, or pressed on. Thus they hold the connection device mechanically and also connect it electrically. The metallic contact feet can end in connection contacts, in particular plug-in contact lugs or plug-in contact pins, in a housing of the connection device, so that a corresponding connection plug can be plugged thereinto or plugged thereonto. The contact feet or the corresponding metal parts are usually plugged into an underside of the connection device or the housing thereof, so that they are held upwards. As a result, they are open on the underside, i.e., towards the outside of the carrier.

According to the invention, additional electrical insulation is arranged or provided between the connection device and/or its contact feet on the one hand and the outside of the carrier on the other hand. Even if the connection device and thus also the contact feet run a little above the outside or above the carrier, for example at a distance of at least 0.3 mm or 1 mm, an even better electrical insulation can be achieved in this way. This increases the safety of the electric heating device. Furthermore, a distance between the outside of the carrier and the connection device or the contact feet can possibly be reduced, as a result of which the heating device can possibly be manufactured more easily because a manufacturing method need not be carried out as precisely and/or as laboriously. There are several options for configuring this additional electrical insulation, each of which will be explained individually below.

In a first advantageous configuration of the invention, the additional electrical insulation is firmly connected to the carrier or is firmly arranged on the carrier. This has the advantage that it cannot be lost or changed in position, for example when the connection device is attached. This ensures the electrical insulation effect.

In general, it can be provided that the carrier has a weld seam or a connecting seam, which runs in its longitudinal direction and also transversely to the circumferential direction. Such a weld seam or connecting seam can be created by the pipe being produced from an originally flat sheet metal which is bent into a pipe shape, with the two end edges then lying against one another and being connected or welded to one another. Such a weld seam or connecting seam usually runs in the longitudinal direction of the carrier and transversely to the circumferential direction, i.e., parallel to a central longitudinal axis of the pipe. The connection device is preferably arranged over the weld seam and straddles it, it being possible for the connection device to be at a distance from the weld seam. Such a distance can be 0.3 mm to 5 mm. It is possible to smooth the weld seam or connecting seam somewhat after it has been produced, at least on the outside of the carrier, for example by rolling or grinding. However, it is not always possible to ensure that the weld seam does not protrude a little beyond the otherwise continuous rounded surface or outside of the carrier. It is therefore usually difficult in the region of the weld seam to carry out a precise or precisely definable coating of the outside of the carrier, for example using an aforementioned screen-printing process.

In a preferred configuration of the invention, heating conductors, contact fields, and conductor tracks are therefore arranged exclusively next to the weld seam or connecting seam. They do not cover them, so that the aforementioned problems with regard to an exact coating do not arise. They are particularly advantageously at a distance of at least 1 mm from the connecting seam or an edge of the weld seam, in particular at least 5 mm. It can thus advantageously be provided that the contact fields are arranged closest to the weld seam, and that on both sides. The connection device can then run or be arranged over the weld seam. Since no heating conductors should usually run very close to the connection device and in particular underneath it, the region near the weld seam can be readily used for the connection device.

According to a first possible configuration of the first basic configuration of the invention, the additional electrical insulation is formed by the insulating layer or by a region of the insulating layer. This insulating layer thus runs at least partially over the weld seam, advantageously over a substantial region of the length thereof or at least in a region such that it runs between the connection device and the outside of the carrier, preferably going 1 mm to 10 mm beyond. If the insulating layer is applied using an advantageous thick-film process such as screen-printing, the weld seam is considerably less disruptive than in the case of the aforementioned heating conductors, contact fields and conductor tracks, since these must be applied with a precise width and precise thickness. Variations in thickness are not very disruptive to the insulating layer as long as it is of sufficient magnitude or thickness. Since it is applied over an area or over a large area, there is also no lateral limitation or spread to be considered.

In a further configuration it can be provided that the electrical insulating layer on the outside of the carrier comprises a plurality of individual insulating layers or is formed from a plurality of individual insulating layers. They lie on top of one another in layers, so that their respective individual thicknesses add up to a total thickness. This can advantageously be two to five or two to three individual insulating layers. At least one individual insulating layer is provided as additional electrical insulation directly between the outside of the carrier and the connection device. It can cover the aforementioned weld seam or be applied thereover. In a preferred configuration, at least one individual insulating layer less than the number of individual insulating layers provided on top of one another can be provided directly between the outside of the carrier and the connection device, in particular under the heating conductors. Exactly one less individual insulating layer can be provided under the connection device than in total. However, this is still regarded as sufficient electrical insulation of the outside of the carrier from the connection device, since the connection device, unlike the heating conductors, conductor tracks, and contact fields, does not lie directly on the individual insulating layer, but runs over it at a certain distance, as mentioned above. Furthermore, this configuration makes it possible for the individual insulating layers to be designed or provided not to be closed all the way around in the circumferential direction of the carrier. They can be at a distance from one another at the ends thereof oriented in the circumferential direction, or the two opposite ends of an individual insulating layer can be at a distance of between 1 mm and 30 mm from one another and thus have or form a free spaced region. As a result, it is possible to avoid the above-mentioned problem that no overlapping can or should occur during an application, for example, using the screen-printing method. Then the screen would again lie in the freshly applied thick-layer paste and the result would be a very unclean screen-print and thus a very uncleanly applied individual insulating layer. This could even negatively affect their possible full-surface formation, which must be avoided at all costs.

In a further preferred configuration, it can be provided that at least two individual insulating layers lie one on top of the other to form the insulating layer overall. The ends thereof, each oriented in the same circumferential direction, overlap each other in an offset manner or are arranged offset from one another in such a way that the distances to the other end of the same layer, i.e., the gaps or the spacing regions in each of the individual insulating layers, so to speak, do not cover or overlap each other, but rather are offset from each other. This means that at least one of the two individual insulating layers always covers the outside of the carrier. Advantageously, the distances or spacing regions between two ends of the same individual insulating layer or the corresponding gap are not offset from one another or not much more than necessary, so that with the at least two individual insulating layers these regions with a reduced total thickness of the insulating layer lie within a limited and preferably the narrowest possible range. For example, two such gaps or spacing regions of two individual insulating layers running one above the other can be laterally offset or spaced apart from one another by only 1 mm to 5 mm.

It is also possible to provide three individual insulating layers lying directly one on top of the other. The two ends of the lowermost individual insulating layers can lie below the two ends of the uppermost individual insulating layer, so that these ends overlap in each case. Thus, the respective distances or spacing regions between the two ends also cover each other. Both ends of the intermediate middle single insulating layer are arranged offset such that a distance between these two ends is covered by a continuous region of the lowermost individual insulating layer and a continuous region of the uppermost individual insulating layer. In this way it can be achieved overall that the outside of the carrier is covered almost everywhere by two or by three individual insulating layers. A single individual insulating layer is then provided only in a strip-shaped region and with a width corresponding to the distance between the two ends. However, the above-mentioned weld seam can run in this region or this region can cover the above-mentioned weld seam. In the region of the weld seam, provision may even be made for two individual insulating layers to run over or cover it.

It can be provided that after the application of the heating conductors, contact fields, and conductor tracks to the insulating layer, another covering layer is applied to the carrier or covers the layer structure, in particular as a protective layer. At least the contact fields should remain free. Since this covering layer is also advantageously applied using the screen-printing process, it should, similar to the individual insulating layers, not be provided over the entire region, i.e., with overlapping ends. Rather, the ends should also be at a distance from one another. Thus, this capping layer is similar to the aforementioned individual insulating layers, and there can be a corresponding overlap of the distances between the ends thereof as previously described. Thus, it can preferably be provided that the covering layer is provided at least where the previously smallest layer thickness is provided in the insulating layer. The distance between the two ends of the covering layer should then be greater than a distance between two ends of an individual insulating layer, but not where the smallest thickness of the entire insulating layer is intended to be.

According to a second possible configuration of the first basic configuration of the invention, the electrical insulation is formed by an electrically insulating capping layer, which is provided as a paint, paste or adhesive below the connection device. This capping layer is then formed differently from the insulating layer, in particular also differently from an aforementioned covering layer. In principle, the capping layer can be applied in a variety of ways, for example by spraying, dispensing, printing, gluing, or the like. This capping layer is then not provided over the entire area of the outside or of the carrier, but only in the region of the connection device. It should be at least as large as the vertical projection of the connection device on the carrier. In particular, it can be somewhat larger, advantageously overlapping this projection by between 5% and 50% or between 1 mm and 10 mm in one direction or in both directions, or protruding from under the connection device.

According to a second basic configuration of the invention, the electrical insulation is a rigid insulation part or at least an independent part that is not attached to the outside of the carrier, like for example one of the aforementioned layers or coatings. On the one hand, this enables production of the electrical insulation independently of the carrier and its layers. On the other hand, such a rigid or independent insulation part can be manufactured in different and independent ways and can be attached either to the carrier or, advantageously, to the connection device itself. One possibility is to attach the insulation part to the underside of the connection device. It can then still be provided that the contact feet are installed in the connection device from below, for example plugged in. So that they do not risk causing a short circuit or the like, they are covered or insulated underneath by means of the attached insulation part. Only the region of the contact feet, which extends laterally from the connection device and in any case runs substantially or completely over a contact field located underneath, is then free because it is also connected or soldered thereto. It is not covered by the insulation part. In this case, the insulation part in the projection can be as large as the connection device or not protrude laterally therebeyond.

Such an insulation part can advantageously be attached to the connection device when the connection device is not yet attached to the carrier or attached to the contact fields with the contact feet thereof. This can preferably be a step, in particular a last step, in the manufacture of the connection device itself, in particular after the contact feet have been introduced into the connection device or into a housing of the connection device. The insulation part can be attached to the underside of the connection device by gluing, alternatively by pressing, clamping, latching, or the like.

In general, it can advantageously be provided, similar to what has been described above, that the metallic contact feet protrude laterally at the bottom or in the region of the underside of the connection device or protrude outward beyond their vertical projection. With these regions they can be brought into contact with contact fields and soldered to thereto. The electrical insulation according to the invention should therefore be provided between the contact feet on the one hand and the outside of the carrier on the other hand, and that below the connection device. Of course, there should be no electrical insulation at the ends of the contact feet that protrude outwards, since the contact feet are intended to be soldered to the exposed contact fields here. Furthermore, it can advantageously be provided that the outside of the carrier is formed without an insulating layer or not with a complete insulating layer where the electrical insulation runs. This is particularly advantageous in the case of a previously mentioned rigid insulation part that is independent of the carrier.

It can thus be provided that a rigid insulation part is produced separately from the carrier, in particular is attached to the connection device before it is attached to the carrier. On the other hand, an individual insulating layer, a plurality of individual insulating layers or an aforementioned capping layer, which differs from the individual insulating layers or an insulating layer, is applied to the carrier and is thus permanently connected thereto. Only then is the connection device attached to the carrier.

These and other features emerge from the description and the drawings, in addition to the claims, wherein the individual features can be realized in themselves either alone or severally in the form of sub-combinations in one embodiment of the invention and in other areas and can constitute advantageous embodiments eligible for protection in themselves, for which protection is sought here. The subdivision of the application into individual sections and subheadings does not limit the general validity of the statements made thereunder.

DETAILED DESCRIPTION OF THE EXAMPLES

Figure 1:
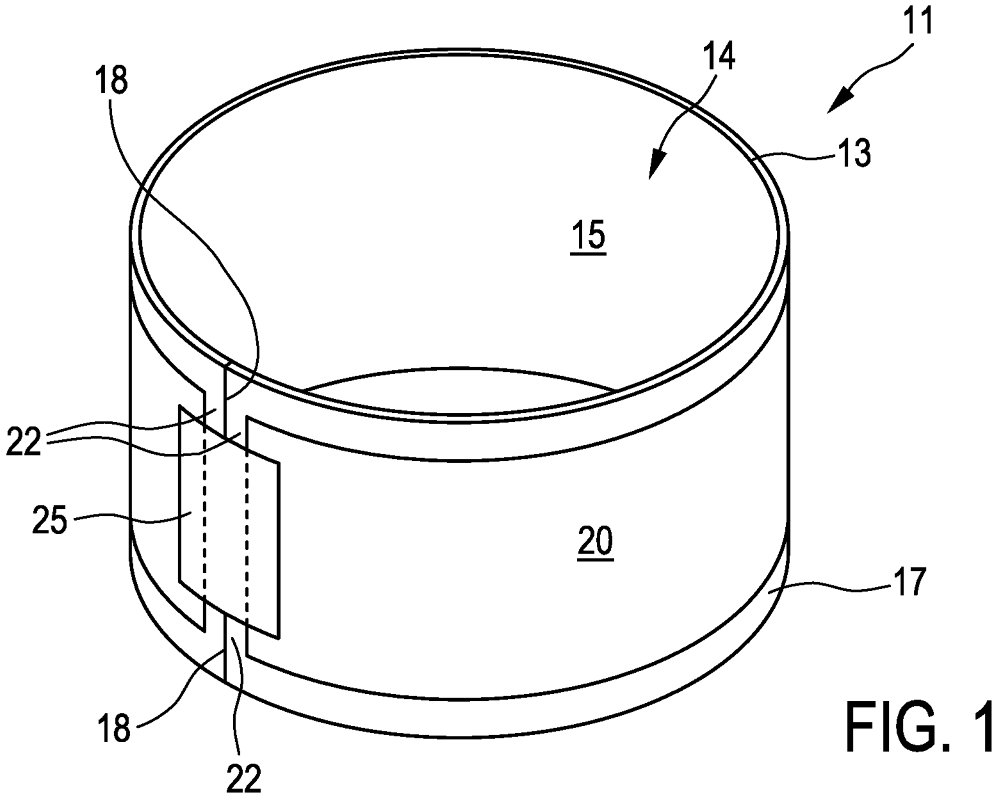
FIG. 1 shows an oblique view of a heating device according to the invention in the region of a weld seam with which it is formed into a tube.

FIG. 1 shows a tubular heating device 11 according to the invention having a tubular carrier 13. The tubular carrier 13 encloses a corresponding inner space 14. It has an inside 15 and an outside 17. As explained at the outset, the carrier 13 can be produced from a flat steel sheet by bending it round and connecting it at the ends by means of a weld seam 18. After production, the weld seam 18 can be machined on the inside and/or on the outside. This can be done by brushing, grinding, or by rolling, i.e., by applying intense pressure. The heating device 11 can be a heating device for a pump according to US 2013/0022455 A1, for example. The inner space 14 then contains water that is heated by the heating device 11.

The heating device 11 has heating conductors on the outside 17, which are not shown in detail here, but which are known from the prior art. Since these heating conductors cannot be applied directly to the metallic carrier 13, an insulating layer 20 is required, which is shown here. The insulating layer 20 is at a distance from the upper edge and the lower edge of the carrier 13, but this can be configured differently. Furthermore, the ends of the insulating layer 20 pointing towards one another have a free spacing region 22 in between, the width of which can be, for example, approximately 3% to 10% of the diameter of the carrier 13. This free spacing region 22 is essentially due to the manufacturing process. If the insulating layer 20 is produced by means of screen-printing, as has been explained above as being advantageous, it cannot be closed in an overlapping or completely surrounding manner with the desired high-quality printing result. In addition, since the weld seam 18 is somewhat more difficult to print on than the rest of the outside 17 of the carrier 13, the free spacing region 22 is provided therearound. Since a connection device is now to be attached at this location, as can be seen in the following FIGS. 2 and 6, and metallic contact feet protrude from the connection device, it is not permissible to leave the metallic and free outside 17 without insulating layer 20.

For the aforementioned reasons, a capping layer 25 is provided in the region of the free spacing region 22 as a basic configuration option. This can be applied after the insulating layer 20 has hardened, for example by screen-printing, alternatively by other methods. In yet another alternative, it can be designed as a type of adhesive tape or as a molded-on part and attached to the carrier 13 in a permanent and temperature-resistant manner, for example, glued. The capping layer 25 can consist of different suitable materials, for example also of appropriately temperature-resistant plastic or silicone. If it is applied as a layer in a coating process, for example thick-film process using screen-printing, it can be a conventional layer of glass, or the like, or be glass-containing. The capping layer 25 reliably covers the free spacing region 22 and thus the metallic outside 17 of the carrier 13, so that a connection device can be attached without any problems according to FIG. 2 without a short circuit risk.

Figure 2:
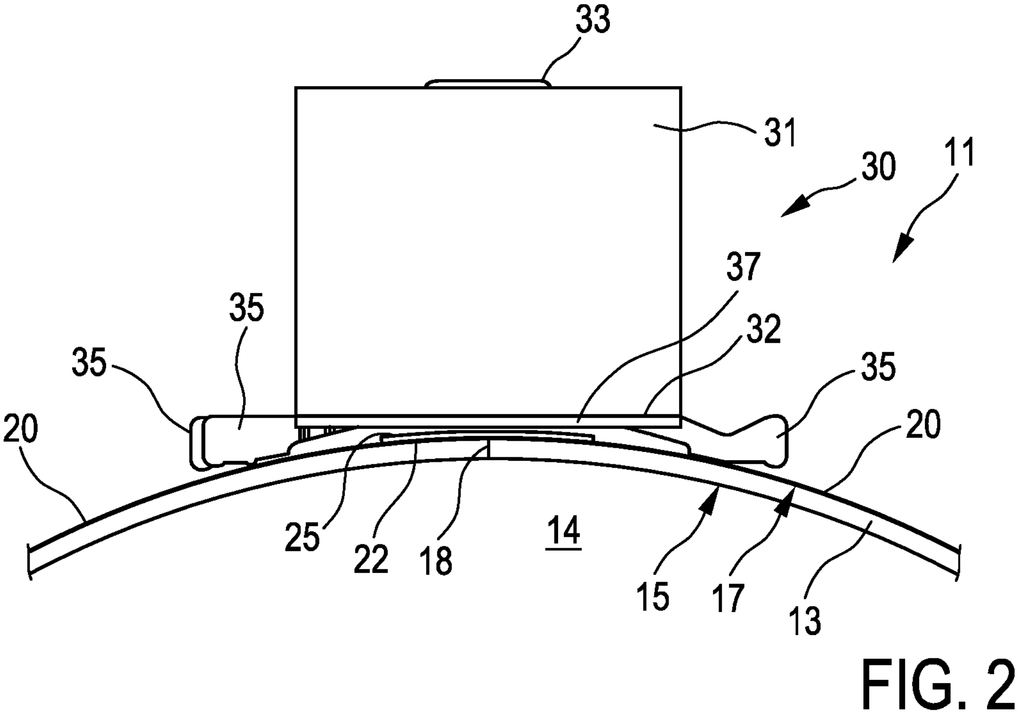
FIG. 2 shows a top view of the heating device of FIG. 1 with a connection device attached thereto.
Figure 5:
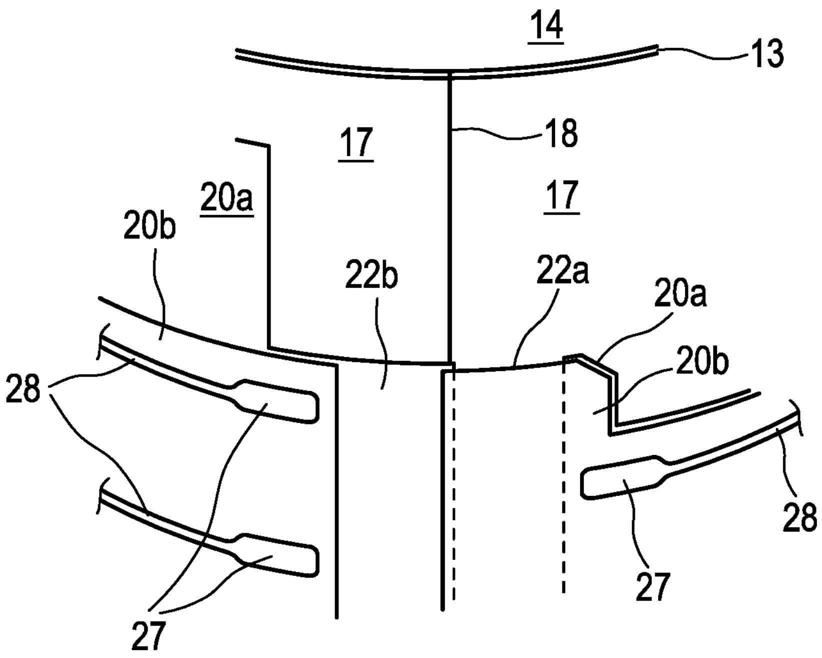
FIG. 5 shows an enlargement of a region of the outside of the carrier having a weld seam and a plurality differently overlapping insulating layers and contact fields.

FIG. 2 shows said plan view in enlargement from above. The connection device 30 has a connection housing 31, from which the uppermost part of a protruding plug-in lug 33 can be seen. In this regard, reference is also made to FIG. 6. At the bottom on an underside, contact feet 35, which can be soldered to contact fields and alternatively can also only be pressed on, protrude from the connection device 30 or from the connection housing 31 to the left and to the right. A single solid soldered or welded connection to the carrier 13 is then sufficient, for example to a ground connection. Such contact fields 27, which merge into conductor tracks 28, are shown in FIG. 5 by way of example. This is explained in more detail in the following.

As can be seen from FIG. 2, a free spacing region 22 of the insulating layer 20 is covered by the capping layer 25 with sufficient overlap. Thus, the carrier 13 is adequately insulated from the connection device 30. In this basic configuration of the invention, the capping layer 25 thus forms the additional insulation.

Figure 3:
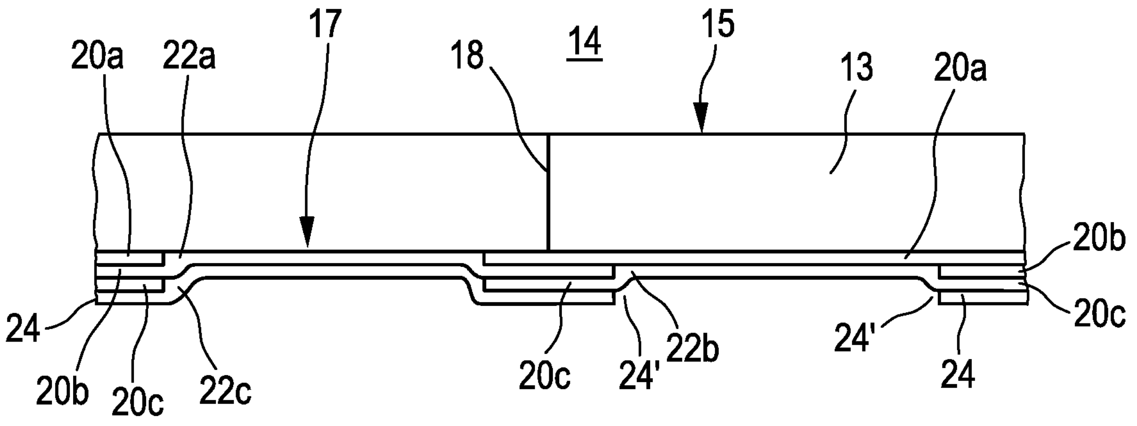
FIG. 3 shows a sectional view through a layer structure of the carrier itself including insulating layers thereon.
Figure 4:
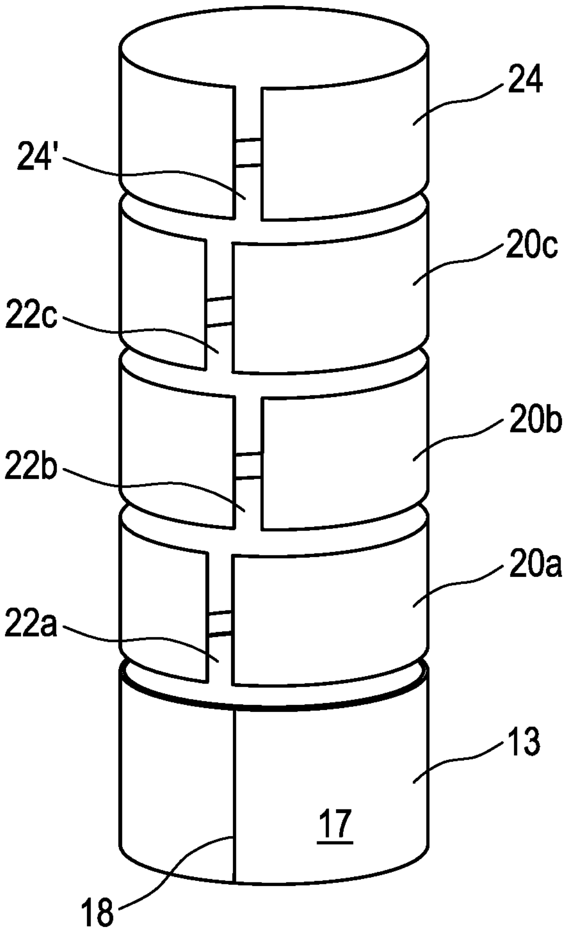
FIG. 4 shows the layer structure according to FIG. 3 pulled apart along the longitudinal direction of the carrier.

Another basic configuration option for additional insulation is shown in FIGS. 3 and 4. The strong enlargement of the sectional view in FIG. 3 shows the carrier 13 with the weld seam 18 along with the inside 15 and outside 17. A first individual insulating layer **20*a* is applied to the outside 17. It comprises a free spacing region 22*a* which is to the left of the weld seam 18. The right end region of the individual insulating layer 20*a* thus covers the weld seam 18** here.

A further individual insulating layer **20*b* is applied to the individual insulating layer 20*a*, basically of the same material, using the same method and with the same thickness. A free spacing region 22*b* lies to the right of the weld seam 18 and thus does not overlap with the free spacing region 22*a* of the individual insulating layer 20*a* thereunder. A further individual insulating layer 20*c* is applied thereto, the free spacing region 22*c* of which is in turn shifted or offset to the left. It is thus located approximately exactly above the free spacing region 22*a* of the lowermost individual insulating layer 20*a*. A total of three individual insulating layers 20*a*, 20*b*, and 20*c* are therefore provided here, each with free spacing regions 22*a*, 22*b*, and 22*c*. The carrier 13 therefore has at least one individual insulating layer 20 everywhere on the outside 17 thereof, and except for the region around the weld seam 18 there are three individual insulating layers 20. This also applies to the weld seam 18** directly.

The aforementioned heating conductors, contact fields 27, and conductor tracks 28 are applied as usual to the uppermost individual insulating layer **20*c*. The heating conductors and conductor tracks 28 are in turn covered in the usual way by means of a protective layer 24, which is advantageously a glass-containing layer. In this case, the contact fields 27 remain free for making an electrical contact. The protective layer 24 also has a free spacing region 24' which exactly corresponds to that free spacing region 22*b* of the individual insulating layer 20*b*. It results from the difficulty of printing all the way around in the circumferential direction of the carrier, as has been explained before. This protective layer 24, similar to a further individual insulating layer 20**, achieves sufficient electrical insulation even in the region of the free spacing regions relative to the connection device.

From the exploded representation of FIG. 4 it can be seen how the three individual insulating layers **20*a*, 20*b*, and 20*c* are offset to one another above the carrier 13 with the outside 17 and the weld seam 18. The offset is so great that the free spacing regions of two insulating layers 20 applied directly one after the other do not overlap or an overlap of at least a few millimeters is obtained. The fact that this always runs exactly over the weld seam 18** can be advantageous to cover it, but it need not be like this.

The capping layer 24 is provided as the top layer, with the functional structure of the heating device 11 being applied to the individual insulating layer **20*c* in the form of the heating conductors, contact fields, and conductor tracks during manufacture between the application of the individual insulating layer 20*c* and the protective layer 24**.

The enlarged top view of FIG. 5 shows how differently shaped individual insulating layers **20*a* and 20*b* are arranged on the carrier 13 with the outside 17 and the weld seam 18. The free spacing region 22*a* of the individual insulating layer 20*a* is shifted to the right of the weld seam 18. The free spacing region 22*b* of the individual insulating layer 20*b* is shifted to the left of the weld seam 18. The ends of the individual insulating layers 20*a* and 20*b* overlap a few millimeters here, and both end regions run above the weld seam 18. For the sake of simplicity, only two individual insulating layers 20*a* and 20*b*** are provided here. The fact that their contours are different plays no role here.

It can also be seen from FIG. 5 that two contact fields 27 with conductor tracks 28 are provided at approximately the same lateral distance from the weld seam 18 on the left and one contact field 27 with a conductor track 28 is provided on the right. This means that the connection device 30 is arranged approximately centrally above the weld seam 18.

Figure 6:
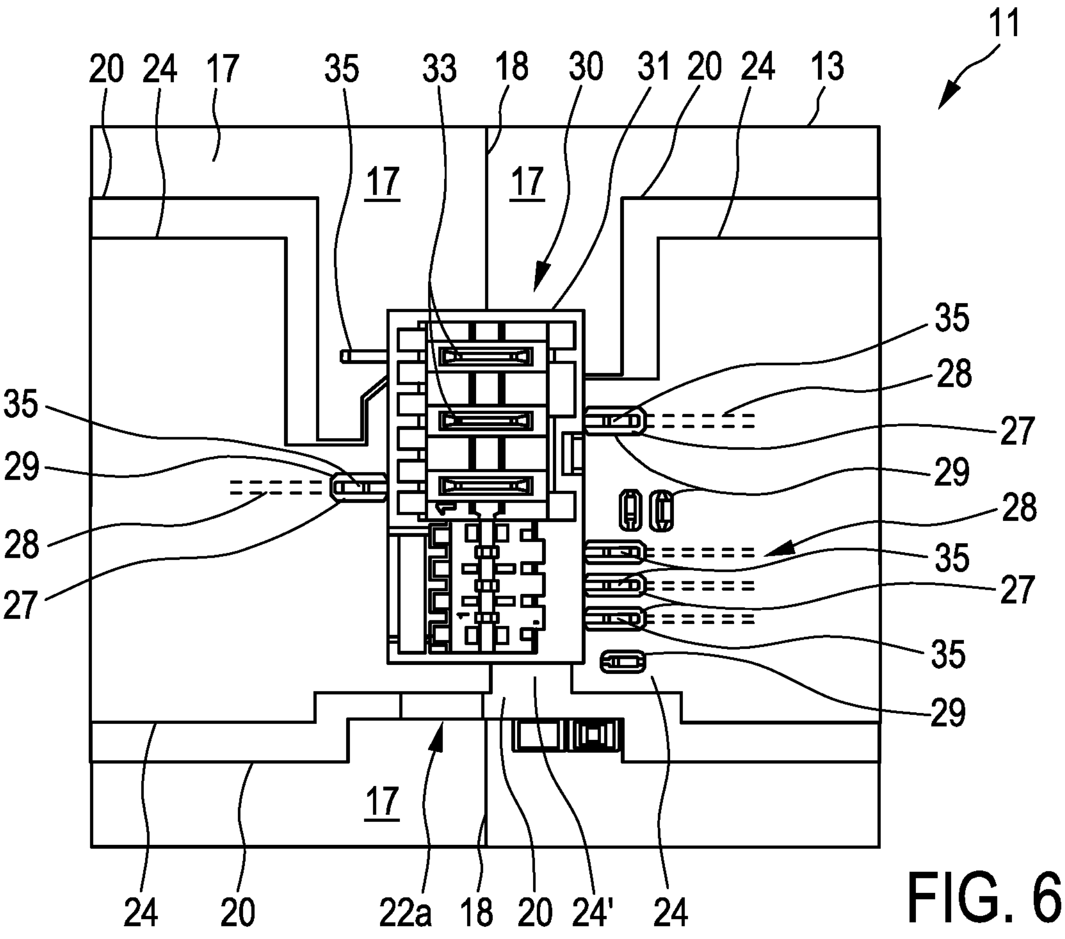
FIG. 6 shows a plan view of the heating device of FIG. 2

This can be seen in FIG. 6 with the entire insulating layer 20 and protective layer 24 thereon. Below the connection device 30, the free spacing region **22*a* of the uppermost individual insulating layer of the entire insulating layer 20 and a free spacing region 24' of the protective layer 24 can be seen. The individual insulating layers overlap according to FIG. 5 and are arranged once to the left and once to the right of the weld seam 18. In the case of the protective layer 24, the free spacing region 24' is, so to speak, open or not covered. Here the insulating layer 20** underneath is exposed.

Metallic contact feet 35 protrude laterally below the connection device 30. The top left contact foot 35 is directly soldered or welded to the outside 17 of the carrier 13. The contact foot 35 arranged at some distance therebelow is soldered onto a contact field 27 together with a conductor track 28 which is located on the upper individual insulating layer 20. The substantial region of the connection device 11 is covered here with the protective layer 24 according to FIG. 4, wherein the contact fields 27 in this protective layer 24 should be exposed. For this purpose, the protective layer 24 has windows 29 for each contact field 27. The conductor tracks 28 run beneath the protective layer 24 and outside the windows 29, which is why they are shown in dashed lines.

A few contact feet 35 also protrude from the connection device 30 to the right, and these are soldered to contact fields 27 with corresponding conductor tracks 28 inside the window 29. From the top view of the connection device 30 it can be seen that in the connection housing 31 thereof is arranged a plurality of plug-in lugs 33. Each of these plug-in lugs 33 is formed integrally with a contact foot 35. They are plugged into the connection housing 31 from below, that is to say from an underside 32.

Figure 7:
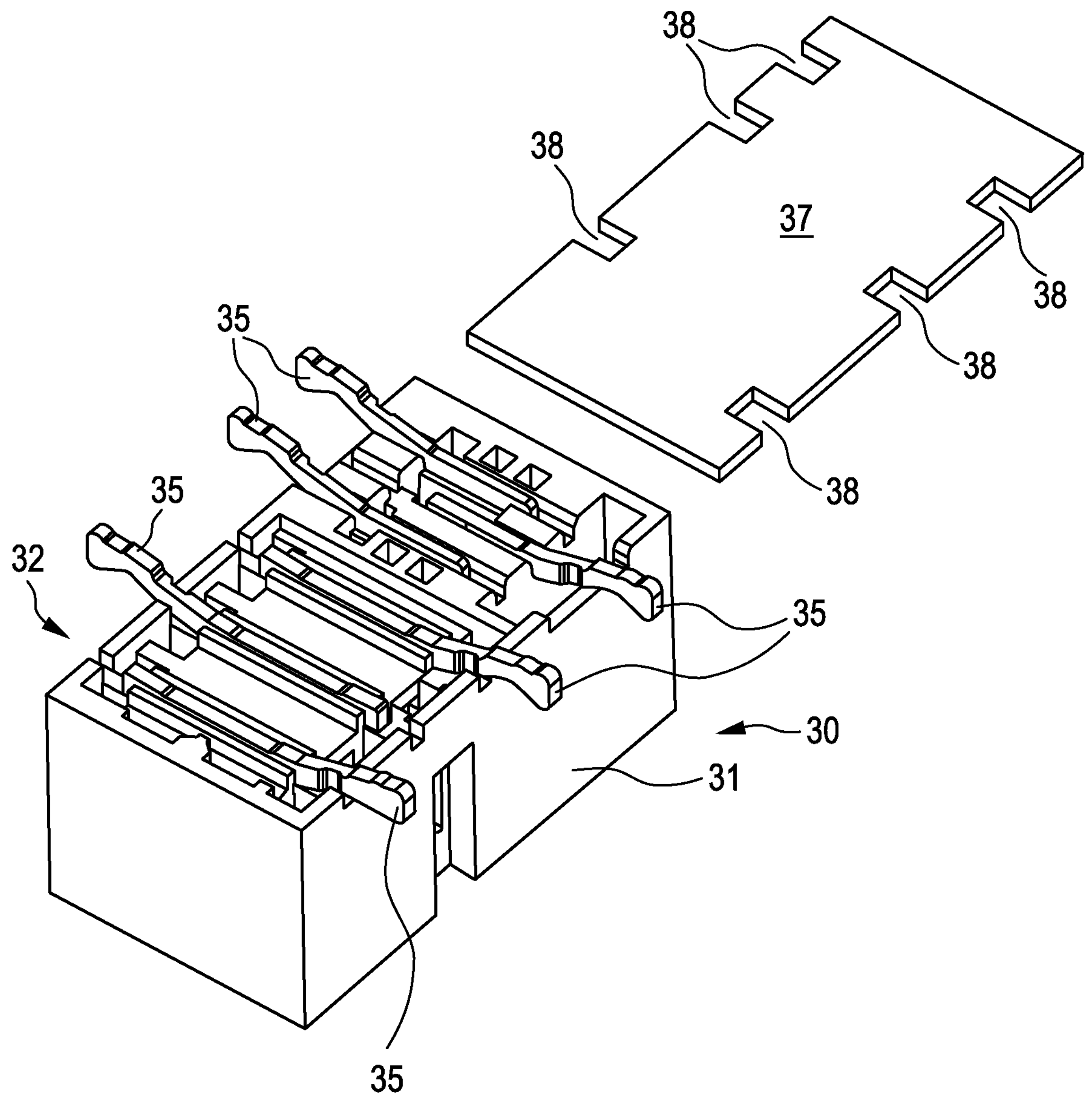
FIG. 7 shows an oblique view of the connection device from below with protruding contact feet on the sides and an underside cover for covering.

This underside 32 of the connection housing 31 of the connection device 30 is shown in FIG. 7. The connection housing 31 must be open here in a certain way or the contact feet 35 must be exposed, otherwise they could not be plugged into the connection housing 31 on this underside 32 and fastened, clamped, or latched thereto.

Another basic configuration of the additional insulation according to the invention is shown here in FIG. 7. An underside cover 37 can be seen there, shown thereabove to the right, which can be fastened to the underside 32. The underside cover 37 has small incisions 38 so that the contact feet 35 can pass through here. The underside cover 37 can be attached to the underside 32 of the connection housing 31 either simply by gluing, or alternatively with latching lugs or other similar protruding parts can protrude downwards from the underside cover 37, which can automatically be attached to the clearly visible complex structure of the underside 32 of the connection housing 31. The configuration of the incisions 38 for the contact feet 35 can also provide that the underside cover 37, which is also shown in FIG. 2, can run at a relatively small distance from the outside 17 of the carrier 13. Even if it should be able to detach from the connection housing 31, it cannot slip due to the form-fitting mounting between the contact feet 35 and the incision 38. In any case, it can still retain its electrical insulating effect.

The invention claimed is:

1. A heating device comprising:

a tubular carrier with an outside and with an inside, an insulating layer for electrical insulation on said outside of said carrier, heating conductors, conductor tracks, and contact fields on said insulating layer, a connection device for an electrical connection of said heating device, said connection device having a plurality of metallic contact feet, said connection device being arranged or attached at said contact fields and being electrically connected to said contact fields with said contact feet, wherein an additional electrical insulation is provided between said connection device and said outside of said carrier, and wherein said carrier has a weld seam which runs in a longitudinal direction of said weld seam and transversely to a circumferential direction of said carrier, wherein said connection device is arranged above said weld seam and straddles said weld seam at a distance therefrom.

2. The heating device according to claim 1, wherein said additional electrical insulation is firmly connected to said carrier or is arranged firmly on said carrier.

3. The heating device according to claim 1, wherein said connection device is arranged above said weld seam and straddles said weld seam at a distance of 0.3 mm to 5 mm therefrom.

4. The heating device according to claim 1, wherein said heating conductors, said conductor tracks, and said contact fields are arranged exclusively next to said weld seam without covering said weld seam.

5. The heating device according to claim 4, wherein said heating conductors, said conductor tracks, and said contact fields are arranged exclusively next to said weld seam at a distance of at least 1 mm from said weld seam.

6. The heating device according to claim 2, wherein said additional electrical insulation is a region of said insulating layer, wherein said insulating layer comprises a plurality of individual insulating layers on said outside of said carrier, wherein at least one said individual insulating layer is provided as additional electrical insulation directly between said outside of said carrier and said connection device, wherein directly between said outside of said carrier and said connection device is provided at least one said individual insulating layer less than a total number of said individual insulating layers provided on top of one another.

7. The heating device according to claim 6, wherein exactly one said individual insulating layer less than said total number of said individual insulating layers is provided directly between said outside of said carrier and said connection device.

8. The heating device according to claim 6, wherein said individual insulating layers are not closed all the way round a circumferential direction of said carrier and are at a distance from one another at ends of said individual insulating layers oriented in said circumferential direction or in between.

9. The heating device according to claim 8, wherein said distance from one another at said ends of said individual insulating layers is between 1 mm and 30 mm.

10. The heating device according to claim 8, wherein in a case of two said individual insulating layers lying directly on top of one another, said ends of said individual insulating layers oriented in said circumferential direction overlap in an offset manner or are arranged offset in such a way that said distance between said two ends of one said individual insulating layer does not overlap with said distance between said two ends of another insulating layer, wherein at least one single said insulating layer is provided on said outside of said carrier everywhere in said circumferential direction.

11. The heating device according to claim 10, wherein three said individual insulating layers are provided lying directly on top of one another, wherein two ends of a lowermost individual insulating layer lie beneath two ends of an uppermost individual insulating layer or two ends of said layers overlap each other, and wherein also respective distances between said two ends overlap in each case, wherein two ends of an intermediate middle individual insulating layer and a distance between said two ends are covered by a continuous region of said lowermost individual insulating layer and a continuous region of said uppermost individual insulating layer.

12. The heating device according to claim 11, wherein said outside of said carrier is covered all over by one, two, or three said individual insulating layers.

13. The heating device according to claim 8, wherein said carrier has a weld seam which runs in a longitudinal direction of said carrier and transversely to a circumferential direction of said carrier, wherein said connection device is arranged above said weld seam and straddles said weld seam at a distance from said weld seam, wherein at least one said individual insulating layer runs over said weld seam.

14. The heating device according to claim 13, wherein one said individual insulating layer less than between said outside of said carrier and said heating conductor runs over said weld seam.

15. The heating device according to claim 1, wherein said electrical insulation is an electrically insulating capping layer in the form of paint, paste, or adhesive below said connection device, wherein said capping layer is formed differently from said insulating layer.

16. The heating device according to claim 15, wherein said capping layer is applied by spraying, dispensing, printing, gluing, or the like.

17. The heating device according to claim 15, wherein said capping layer is at least as large as a vertical projection of said connection device onto said carrier or overlaps said connection device between 5% and 50% in one direction or in both directions of said connection device.

18. The heating device according to claim 1, wherein said electrical insulation is a rigid insulation part which is arranged between said outside of said carrier and said connection device.

19. The heating device according to claim 18, wherein said insulation part is fastened to an underside of said connection device and does not protrude laterally outward beyond a vertical projection of said connection device onto said carrier.

20. The heating device according to claim 1, wherein said metallic contact feet in a region of an underside of said connection device protrude laterally from said connection device, wherein said electrical insulation is arranged between said contact feet and said outside of said carrier, wherein said outside here is without an insulating layer.

21. The heating device according to claim 1, wherein said insulating layer or said individual insulating layers are applied to said outside of said carrier or to said individual insulating layers thereunder by means of a thick-film process or by means of screen-printing, respectively.

22. A method for manufacturing a heating device according to claim 1, wherein a plurality of individual insulating layers are applied to said carrier to form said insulating layer.

23. The method according to claim 22, wherein said electrical insulation between said connection device and said outside of said carrier is formed by a further individual insulating layer, or by a capping layer, or by a rigid insulation part.

24. A heating device comprising:

a tubular carrier with an outside and with an inside, an insulating layer for electrical insulation on said outside of said carrier, heating conductors, conductor tracks, and contact fields on said insulating layer, a connection device for an electrical connection of said heating device, said connection device having a plurality of metallic contact feet, said connection device being arranged or attached at said contact fields and being electrically connected to said contact fields with said contact feet, wherein an additional electrical insulation is provided between said connection device and said outside of said carrier, wherein said additional electrical insulation is firmly connected to said carrier or is arranged firmly on said carrier, wherein said additional electrical insulation is a region of said insulating layer, wherein said insulating layer comprises a plurality of individual insulating layers on said outside of said carrier, wherein at least one said individual insulating layer is provided as additional electrical insulation directly between said outside of said carrier and said connection device, wherein directly between said outside of said carrier and said connection device is provided at least one said individual insulating layer less than a total number of said individual insulating layers provided on top of one another, wherein said individual insulating layers are not closed all the way round a circumferential direction of said carrier and are at a distance from one another at ends of said individual insulating layers oriented in said circumferential direction or in between, and wherein said carrier has a weld seam which runs in a longitudinal direction of said carrier and transversely to a circumferential direction of said carrier, wherein said connection device is arranged above said weld seam and straddles said weld seam at a distance from said weld seam, wherein at least one said individual insulating layer runs over said weld seam.

* * * * *